United States Patent [19]

Wolf et al.

[11] 4,188,040
[45] Feb. 12, 1980

[54] SEALING RING

[75] Inventors: Franz-Josef Wolf; Hans J. Kunze, both of Bad Soden-Salmunster, Fed. Rep. of Germany

[73] Assignee: Firma WOCO Franz-Josef Wolf & Co., Bad Soden-Salmunster, Fed. Rep. of Germany

[21] Appl. No.: 785,204

[22] Filed: Apr. 6, 1977

[51] Int. Cl.² .............................................. F16L 21/02
[52] U.S. Cl. ............................ 277/207 R; 277/207 A
[58] Field of Search ......................... 277/207, DIG. 2

[56] References Cited

U.S. PATENT DOCUMENTS

| | | | |
|---|---|---|---|
| 3,493,237 | 2/1970 | Klendienst | 277/207 |
| 3,690,684 | 9/1972 | Lansaque | 277/DIG. 2 |

*Primary Examiner*—Robert I. Smith
*Attorney, Agent, or Firm*—Webb, Burden, Robinson & Webb

[57] ABSTRACT

A sealing ring of elastic material, more particularly for a plug-in type pipe joint made up of two concentrically interfitting pipe elements of a mineral material in the case of which the sealing ring can be pre-assembled by insertion into the outer pipe element or socket before the insertion of the inner pipe element or spigot. The sealing ring has a substantially V-shaped axial section profile with the formation of two annular lips consisting of a support lip and a sealing lip. The sealing ring also has a sealing foot, which is opposite to the angle included by the support lip and the sealing lip and said sealing ring can be fixed by its sealing foot and/or by a holding part molded additionally on the sealing ring, by dint of an annular groove constructed in the inner wall of the socket in order to prevent axial displacement of the sealing ring in the insertion direction of the spigot. The sealing ring on insertion of the spigot into the socket can be inwardly axially tilted through the radial plane defined substantially by the sealing foot of the sealing ring in such a manner that the support lip and the sealing lip stand substantially symmetrically with respect to the radial plane. When the spigot is inserted the radial clamping and distortion of the sealing ring makes a sealing engagement with the external casing of the spigot with respect to external pressure, the sealing lip makes sealing engagement with the external casing of the spigot with respect to internal pressure and the sealing foot makes sealing engagement with the floor of the annular groove or on the inner wall of the socket with respect to internal and external pressure.

15 Claims, 8 Drawing Figures

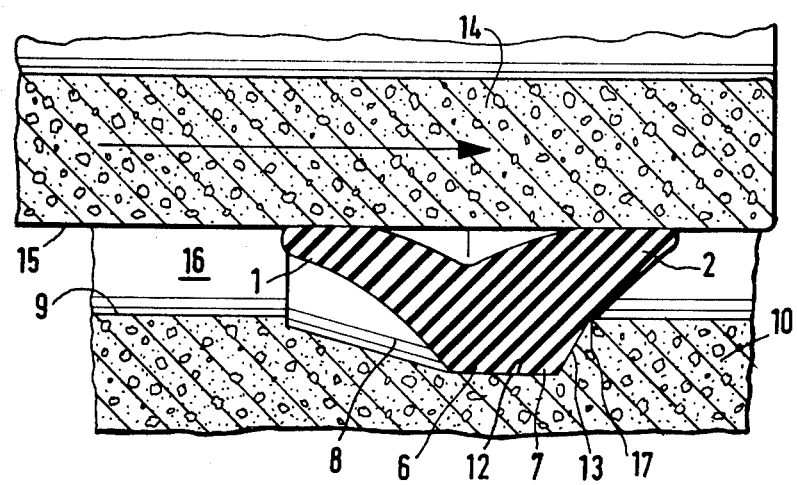
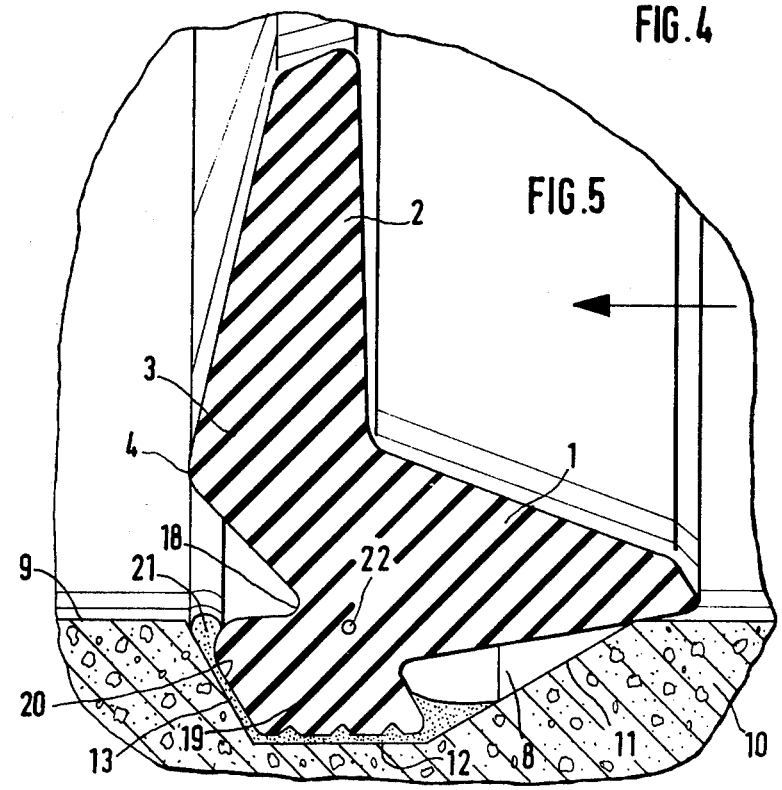

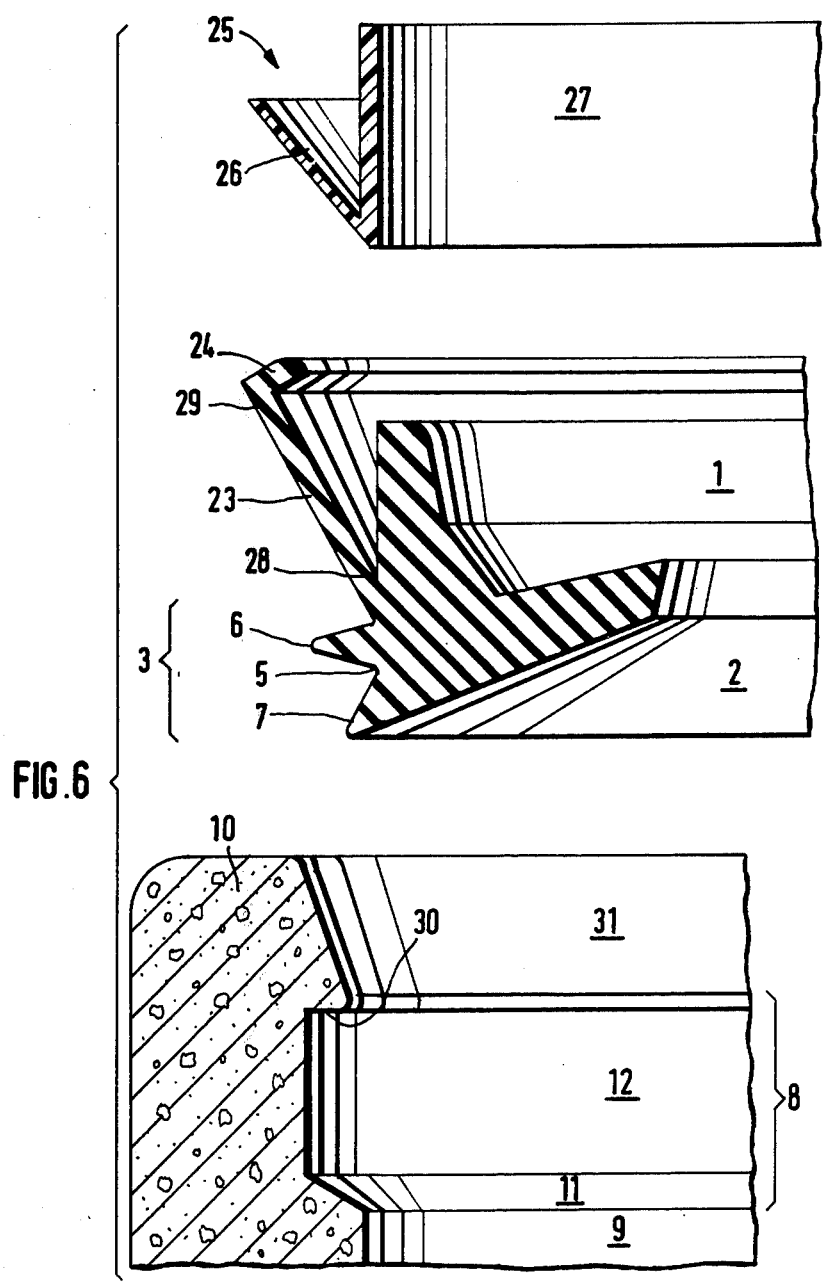

SEALING RING

The invention relates to a sealing ring of elastic material, more particularly rubber, for sealing a pipe joint comprising two concentrically interfitting pipe elements.

The term "pipe elements" is to be taken to mean in the following specification not only smooth pipes ("pipe stock") but also sockets, more particularly bell-shaped sockets, sleeves, more particularly joint sleeves, casings, reducing pieces, specially shaped pipe stock and the most various different types of joint and union elements providing that the sealing gap to be sealed between the two pipe elements is defined between the inner wall of an outer tube element and the outer wall of an inner pipe element fitted into the outer pipe element.

For the purpose of convenience of expression in what follows the external pipe element is referred to briefly as the "socket" while the inner pipe element is referred to briefly as the "spigot".

The terms "external" and "internal" are in what follows, in the absence of any express indication to the contrary, always radially defined. The terms "on the front side" or "front" and "to the rear" and "back" are in what follows, in the absence of any express indication to the contrary, always defined in terms of an axial movement from the outside into the socket. In the case of a simple plug type pipe joint the spigot is therefore introduced from the front in a rearward direction into the socket ("direction of insertion").

The sealing problem in the case of plug-in pipe joints is particularly important if the two pipe elements consist of a mineral material as for example more especially fired clay or concrete. Such pipe elements can in practice only be produced with relatively large tolerances in manufacture as regards the diameter so that on fitting together the individual pipe elements the narrowest sealing gap within the permitted range of manufacturing tolerances is substantially smaller than the widest sealing gap within the permitted range of manufacturing tolerances between the inner wall of the socket and the outer wall of the spigot. These sealing gap tolerances must be compensated for by the seal, which as a rule is a sealing ring. In this respect the danger arises of excessively large forces be required in the vicinity of the narrow sealing gaps for insertion of the spigot into the socket and in the vicinity of the large sealing gaps the material of the sealing ring may be insufficiently clamped and insufficiently distorted or pressed in order to ensure the required degree of sealing properties in the pipe plug-in joint.

Additionally the problem of the shear load arises, that is to say the problem of a substantially radially directed unilateral loading on the seal, more particularly in the case of pipes laid in the ground. If the sealing ring is strongly or very strongly radially loaded at one point it will be inclined to leak at the diametrally opposite point.

Furthermore such pipes of mineral materials can never be produced so as to be perfectly round even if the greatest degree of care is taken in manufacture. At least in practice they always have a certain degree of departure from a perfectly round shape. Such departures from a round shape at the seal line of plug-in pipe joints can frequently occur cumulatively, that is to say in addition to the two above mentioned effects.

Numerous sealing rings have already been proposed, which in their own particular manners attempt to fulfil simultaneously the requirement of ensuring low insertion forces over the whole range of tolerances in the sealing gap in respect of a spigot, a high quality sealing action for the plug-in pipe joint and a high shear strength.

Previously the requirement in the case of sealing rings of the above type was that they should be fluid-tight with respect to internal pressure up to the pre-established limiting values, that is to say they should resist a pressure which is exerted by the medium flowing in the piping system on the sealing ring. It is only been in recent times that it has become clear that more particularly in the case of piping systems laid in the ground the requirement of a hermetic seal with respect to external pressure is at least just as important as a hermetic sealing action with respect to internal pressure. A hermetic sealing action with respect to external pressure means in this respect that the sealing ring must also provide a sealing action against water and other media which to a certain extent press with a substantial pressure externally on to the sealing ring and their penetration into the interior of the piping system must be avoided under all circumstances.

Having regard to this in addition to the initially mentioned requirements a sealing ring must therefore fulfil the following additional requirements as regards sealing characteristics: (1) a hermetic sealing action against the inner wall of the socket to resist internal pressure, (2) a hermetic sealing action at the inner wall of the socket with respect to external pressure, (3) a hermetic sealing action on the outer wall of the spigot with respect to internal pressure and (4) a hermetic sealing action at the outer wall of the spigot with respect to external pressure.

Not one of the sealing rings which has so far been proposed for plug-in pipe connections can at the present day fulfil these requirements while simultaneously allowing for large tolerances in the sealing gap and fulfil the requirement of low insertion forces in the close sealing gap tolerance range.

One aim of the invention is that of providing a sealing ring of the initially mentioned type which complies with these requirements, can be produced without complicated molding techniques and simultaneously requires such a small amount of working composition that it can also be produced as a cheap mass-produced article when the material cost aspect is taken into account.

In order to attain this aim in accordance with the invention a sealing ring is proposed which has the features mentioned in claim 1.

Further developments of the invention are described in the subordinate claims.

Putting the matter summarily the invention therefore provides a lip sealing ring for plug-in pipe connections with large sealing gap tolerances. The sealing ring consists chiefly of two V-shaped oppositely placed ring lips, of which the one ("support lip") is arranged for sealing against the outer wall of the spigot with respect to external pressure while the other ("the sealing lip") is adapted for sealing against the outer wall of the spigot with respect to internal pressure. The zone ("sealing foot") externally opposite to the angle included by the support lip and the sealing lip, of the sealing ring makes sealing engagement with the inner wall of the socket with respect to internal pressure and external pressure. The sealing foot can in this respect be constructed more particularly for large pipe diameters and heavy pipes which are to be hermetically connected, in the form of a solid preferably slightly rounded annular edge. For smaller rated widths of the sealing ring and lighter pipes a sealing foot annular groove is preferably formed in the sealing foot with the formation of two sealing foot annular lips ("sealing foot lips"). In this case the front sealing foot lip makes sealing engagement with the inner wall of the socket with respect to external pressure and the rear sealing foot lip makes engagement with the inner wall of the socket and sealing against internal pressure. In this preferred embodiment of the invention the sealing ring therefore in all has four sealing annular lips, of which one makes sealing engagement with the spigot with respect to external pressure, one makes sealing engagement with the spigot with respect to internal pressure, one makes sealing engagement with the socket with respect to external pressure and finally one makes sealing engagement with the socket with respect to internal pressure.

For producing the hermetic pipe joint the sealing ring is firstly placed in the socket in such a manner that the support lip lies substantially axially and is opposite to the direction of insertion of the spigot and in such a manner that the sealing lip is substantially radial. The axially lying support lip leaves an internal diameter free, which is at least somewhat larger than the maximum external diameter, having regard to the tolerance range, of the spigot. In this manner it is possible to ensure that each inserted spigot can be introduced freely past the support lip and introduced through it.

The radially standing sealing lip has a free internal diameter, which is substantially smaller than the external diameter, which is the smallest one in the tolerance range, of the spigot. With this feature it is possible to ensure that the spigot introduced freely over the support lip makes engagement with its frontal side on the flank, facing in the direction opposite to the direction of insertion, of the sealing lip. On further insertion of the spigot the sealing ring, owing to the pressing to the rear of the sealing lip by dint of the frontal side of the spigot performs a tilting movement through a radial plane, which runs generally through the sealing foot of the ring. After complete introduction of the spigot this tilting movement finally ensures that the sealing lip and the support lip are substantially symmetrical with respect to an imaginary radial plane substantially through the sealing foot of the ring, and make engagement with the outer wall of the spigot.

In order to ensure that the sealing ring on insertion of the spigot mainly carries out the above described tilting or tipping movement through the imaginary radial plane and is not only pushed in from the frontal side of the spigot and without any tipping axially into the socket the sealing ring must be fixed with respect to axial displacement into the socket while maintaining the free ability to tip at the inner wall of the socket. This is ensured in accordance with the invention by means of an annular groove, constructed in the inner wall of the socket, in two different manners in principle. Either the ring maintains itself in the annular groove owing to its sealing foot or it is attached by means of a holding ring in this annular groove. The holding ring and the actual sealing ring are in this respect connected together by an annular web or a holding lip with each other. The annular web and, respectively the holding lip are in this respect made so thin and make engagement with the sealing ring in such a manner that they do not impair the described possibility of tilting of the ring.

When the ring is held itself directly in the annular groove of the socket the annular groove is constructed axially to the rear with a relatively steep flank ("retaining flank"). The external diameter of the sealing foot of the sealing ring is simultaneously made so large that it corresponds approximately to the diameter of the annular groove floor. In any case the external diameter of the sealing foot is however larger than the maximum clearance internal diameter of the socket which is allowed with respect to the manufacturing tolerance range. Under these conditions the inserted spigot cannot axially push the sealing ring, which at its sealing foot is held by the holding or retaining flank of the annular groove, into the socket in front of it. In the case of this construction of the axial fixing system for the sealing ring the sealing action takes place between the sealing ring and the socket owing to the sealing foot of the ring on the floor of the annular groove.

In the case of axial fixation of the sealing ring using a retaining lip or using an annular web and the retaining ring molded on the latter the holding ring can be fixed in the annular groove of the socket by jamming into position or by adhesive. The seal between the sealing ring and the socket can in this respect be produced by means of the sealing foot of the sealing ring either on the inner wall of the socket itself or in the case of a broad construction of the annular groove it can be produced in the socket on the floor of the annular groove.

The profile thickness of the sealing ring is so selected that the sealing ring, even with the widest possible sealing gap in the tolerance range, still ensures a sufficient clamping and distortion of the ring for bringing about the desired sealing action. Owing to the construction of the ring as a lipped ring at all its points of making sealing engagement it is however possible to ensure in this respect that even with the narrowest sealing gap the insertion forces necessary for insertion of the spigot are at least not substantially larger than the insertion forces, which are required for insertion of the spigot with a wide sealing gap. In this respect it is important that even in the case of a practically complete squashing of the ring with narrow sealing gaps the ring always acts as a lip ring and provides a sealing action, that is to say in addition to the sealing forces applied by the distortion of the material at the lip edges there is additionally a source of sealing forces applied on to all holding or distortion, that is to say simultaneously both against the spigot and also against the inner wall of the socket. This feature ensures that the pipe connections sealed with the sealing ring of the invention remain completely hermetically sealed even with very high internal and external pressures and also when unfavorable shear load conditions exist without this result requiring the use of large quantities of material. When rubber prices are high the small material required for the sealing ring will make itself felt as a further substantial advantage of the invention.

The invention will now be described in what follows with reference to embodiments taken in conjunction with the drawings in which:

FIG. 4 is a representation generally resembling FIG. 3 with the spigot inserted;

FIG. 5 shows a further embodiment of the sealing ring with the holding ring stuck by adhesive in the annular groove of the socket, in axial section;

FIG. 6 shows an exploded view and an axial section of a gripping ring with an associated sealing ring and the external edge of the socket;

Figure 1:
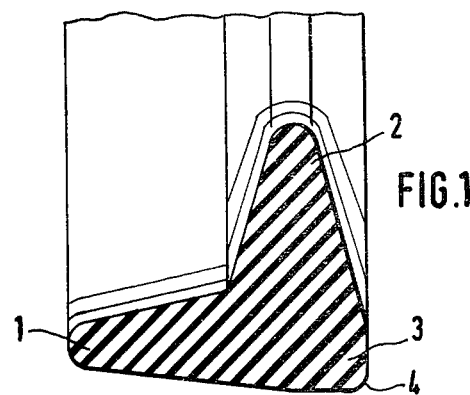
FIG. 1 shows an axial section of one embodiment of the sealing ring.

In FIG. 1 a part view of an axial section of a first embodiment of the sealing ring is shown. The sealing ring is substantially V-shaped and consists of a support lip 1, a sealing lip 2 and the sealing foot 3. In this respect the term "sealing foot" is used to denote that annular part of the sealing ring, which is opposite to the angle included by the support lip 1 and the sealing lip 2, that is to say the range of the external tip of the sealing ring which is substantially V-shaped in axial profile.

In the embodiment shown in FIG. 1 the sealing foot 3 has a rounded external annular edge 4.

Figure 2:
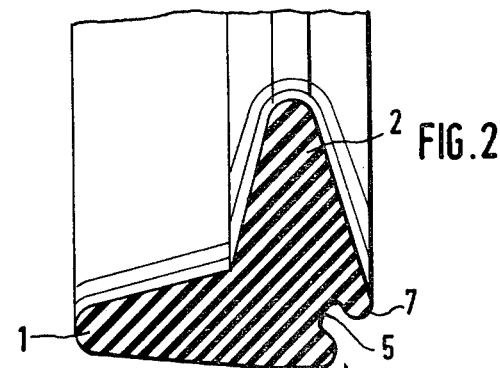
FIG. 2 shows in axial section a modified embodiment of the sealing ring with a sealing foot ring groove.
Figure 3:
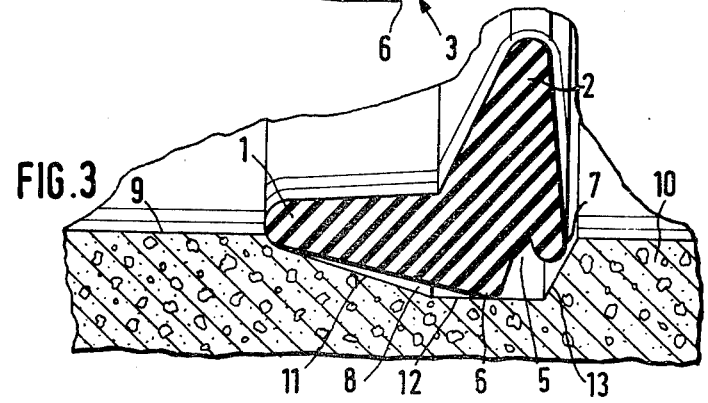
FIG. 3 shows diagrammatically and in axial section a sealing ring used in an annular groove in a socket.

In FIG. 1 the sealing ring is shown in its unstressed or relaxed condition, in which it is placed into the socket preferably with a slight radial compression preloading. The support lip 1 is substantially axially opposite to the direction of insertion while the sealing lip 2 extends substantially radially, and in the representation of FIG. 1 the direction of insertion, as is also the case for FIGS. 2, 3 and 4, is assumed to be from the left to the right. The sealing lip 2 is in this respect made at least so thick that it is not merely deformed into itself by the insertion of the spigot but while tipping or swaying of the whole sealing ring is moved out of the way in a clock-wise direction (in terms of what is shown in FIG. 1). The fulcrum point of this tilting movement, in terms of the cross-sectional profile, is generally adjacent to the sealing foot 3. The annular edge 4 then performs a combined rolling and sliding movement on the inner wall, not shown in the figure, of the socket or on a groove constructed in the socket. The annular edge 4 then acts as a sealing ring, which ensures the sealing action between the sealing ring and the inner wall or the floor of a groove in the socket.

The sealing ring shown in FIG. 1 is particularly well adapted for heavy pipe and for large diameters. It is characterised by a particularly high stressing in the support lip 1 and the sealing lip 2.

FIG. 2 shows a further embodiment of the sealing ring, which differs from the sealing ring shown in FIG. 1 with respect to the construction of a sealing foot ring groove 5 in the sealing foot 3. The sealing foot ring groove 5 ensures the formation of a front sealing foot lip 6 and a rear sealing foot lip 7. The sealing foot annular groove 5 with the two sealing foot lips 6 and 7 and the adjacent zones which are not clearly delimited and merge on the one hand with the support lip 1 and the sealing lip 2 on the other hand are in the present specification referred to as the "sealing foot" 3 in accordance with the above definition.

Owing to the construction of the sealing foot annular groove 5 in the sealing foot 3 the stress in the lips 1 and 2 is made somewhat smaller than in the embodiment shown in FIG. 1. The sealing rings with a sealing foot annular groove are therefore more especially suitable for lighter pipes and a somewhat smaller diameter. "Somewhat smaller diameter" means in this respect diameters of approximately 1 meter and below. In the case of a suitably massive construction of the support lip 1 and the sealing lip 2 it is however also possible to provide sealing rings of still larger diameters with a sealing foot annular groove as well. The advantage of the sealing foot annular groove 5 is more especially due to the fact that in lieu of a sealing foot lip 4, (FIG. 1) two sealing foot lips 6 and 7 (FIG. 2) are formed. The front sealing foot lip 6 in this case ensures a seal between the ring and the socket with respect to external pressure and the sealing foot lip 7 ensures a seal between the sealing ring and the socket with respect to internal pressure.

In the embodiment shown in FIG. 2 the lip edges of the sealing foot lips 6 and 7 are constructed so as to be round. Such a construction encourages rolling and sliding of the sealing foot 3 on the inner wall surface or in the groove of the socket and simultaneously stiffens the sealing foot lips. These edges of the sealing foot lips can however just the same be constructed so as to have sharp edges and either the edge of the sealing foot lip 6 or also the edge of the sealing foot lip 7 can be simultaneously provided with sharp edges or they can either have this feature on only the one or the other edge. Such an embodiment of the sealing ring, in the case of which the lip edge of the sealing foot lip 6 is made with a sharp edge and the lip edge of the sealing foot lip 7 is constructed so as to be rounded, is shown diagrammatically in FIG. 3.

The sealing ring shown in FIG. 3 is inserted into an annular groove 8, which is constructed in the inner wall 9 of a socket 10. The annular groove 8 has a flat front flank ("introduction oblique face") 11, a substantially axially extending floor 12 and a relatively steep rear flank ("retaining oblique surface") 13.

The diameter of the sealing foot 3, more particularly the rear effective part of the sealing foot 3, in the case of the embodiment shown in FIG. 1, that is to say the annular edge 4 and in the case of the embodiment shown in FIGS. 2 and 3 the diameter of the rear sealing foot lip 7, is made so large that in each case it is larger than the internal diameter, which has the largest possible value or size within a manufacturing tolerance range, of the socket 10 at its inner wall 9. As a result it is possible to ensure that the sealing ring cannot be pushed out axially inwards from the annular groove 8 on exertion of the spigot (from the left to the right in terms of FIG. 3). Instead as soon as the frontal side of the spigot meets with the substantially radially projecting sealing lip 2, the sealing ring is swung in a clockwise direction (FIG. 3) and the sealing foot lip 7, more particularly its rounded lip edge, will roll or slide on the steep rear retaining oblique surface 13 of the annular groove 8 as far as the floor 12 of the annular groove 8.

After insertion of the spigot 14 the sealing ring of the embodiment shown in FIG. 3 will generally have assumed the final position shown in FIG. 4. The direction of insertion, in which the spigot has been inserted, is shown by an arrow in FIG. 4.

Both the support lip 1 and also the sealing lip 2 make sealing engagement with the external wall 15 of the spigot 14. Both the front sealing foot lip 6 and also the rear sealing foot lip 7 make sealing engagement with the annular groove floor 12 of the annular groove 8 constructed in the socket 12. The support lip 1 and the sealing lip 2 are in this respect at least substantially symmetrical with respect to an imaginary radial plane, which at least substantially runs through the sealing foot of the sealing ring. In this respect the sealing lip 1 makes sealing engagement with the outer wall 15 of the spigot 14 with respect to external pressure. The sealing lip 2 makes sealing engagement with the outer wall 15 of the spigot 14 with respect to internal pressure. The front sealing foot lip 6 makes engagement with the floor 12 of the annular groove to provide a seal against external pressure and the rear sealing foot lip 7 makes sealing engagement with the floor 12 of the annular groove to provide a sealing action against internal pressure. Additionally, in the case of the embodiment shown in FIG. 4, an edge seal is ensured by dint of the annular edge 17, which is made relatively sharp, between the holding oblique surface 13 and the inner wall surface 9 of the socket 10.

In the case of the embodiment of the invention shown in FIG. 4 the case of a sealing gap 16 which is relatively wide within the tolerance range is represented. The width of the sealing gap 16 is in this case measured in the radial plane from the inner wall 15 of the spigot 14 to the inner wall 9 of the socket. In the case of a closer or narrower sealing gap 16 the sealing ring is distorted and deformed to a greater extent and using a suitable construction in a limiting case it can also practically completely fill up the annular groove 8. The supporting lip 1 and the sealing lip 2 are in this case pressed axially outwards and axially inwards in the sealing gap 16. Even in the case of this extreme case of deformation of the sealing ring however at all four edges of the sealing annular lips 1, 2, 6 and 7 an additional stress component is preserved, which makes a contribution to the high grade sealing action of the plug-in pipe joint sealed with the sealing ring in accordance with the invention.

A further embodiment of the invention is shown in FIG. 5 diagrammatically. The direction of insertion of the spigot (from the right to the left) is indicated by an arrow. In the rear part of the sealing lip 1 there is at its outer side a tapering holding or retaining web 18 produced by moulding, which connects the actual sealing ring in a tilting and pivoting manner, with a holding ring 19. The profile of the holding ring 19 is adapted more particularly at its rear flank 20 to the profile of the annular groove 8 more particularly to the profile of the retaining oblique surface 13. The holding ring 19 is stuck by means of a suitable adhesive composition 21 which complies with the requirements of the respective application for the pipe joint intended, the sticking in position by the adhesive preferably being designed to ensure a sealing action.

On insertion of the spigot not represented in FIG. 5 in the direction of the arrow shown in FIG. 5 the support lip 1 and the sealing lip 2 are pivoted about a point 22, which lies approximately in the flexible retaining lip 18 somewhat towards the sealing foot annular edge 4. On tilting or tipping of the sealing ring generally about the point 22 the sealing foot ring edge 4 comes into engagement with the inner wall surface 9 of the socket 10. The sealing, produced by the sealing ring, of the sealing gap occurs, in the case of the embodiment shown in FIG. 5 as well, again by dint of the support lip 1, the sealing lip 2 and the sealing foot 3 with its sealing foot annular edge 4. The adhesive composition 21 only brings about additional sealing and serves chiefly for holding the sealing ring in the annular groove.

In the case of the embodiment shown in FIG. 5 as well the sealing foot 3 can naturally also have a sealing foot annular groove 5 in the manner shown in FIGS. 1 to 3.

As compared with the embodiment shown in FIG. 3 the sealing ring shown in FIG. 5 offers the advantage that it is held relatively firmly in the socket when the spigot is not inserted. As a result it is more securely retained to prevent any unintended or willful removal or pilfering.

Figure 7:
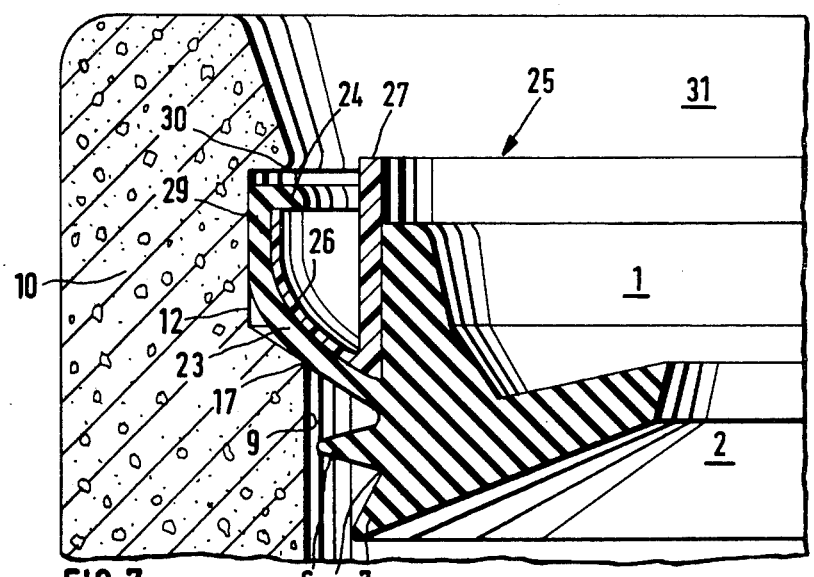
FIG. 7 shows the elements of FIG. 6 in the same representation in the assembled condition.

A further embodiment of the sealing ring is shown in a perspective part view in axial section in FIGS. 6 and 7. This sealing ring as well can also be mounted in the socket 10 to prevent pilfering.

The actual sealing ring with the support lip 1 and the sealing lip 2 and the sealing ring consisting of the front sealing foot lip 6, the sealing foot annular groove 5 and the rear sealing foot lip 7 is additionally provided with a retaining lip 23, which at its front edge carries a gripping bead 24 and is adapted for receiving a clamping ring 25. The holding lip 23 is on the outer side, that is to say the radially outside in terms of the representation of FIG. 6 on the left, of the support lip 1 in its rear part in terms of axial insertion movement of the spigot ahead of the sealing line of the sealing foot 3 and is produced by integral moulding on to the sealing ring. In the recess formed between the outer side of the support lip 1, the inner side of the retaining lip 23 and the gripping bead 24 the clamping ring 25 is clamped in place. The clamping ring 25 consists of a plastics and owing to its shape is resiliently elastic. The clamping ring 25, which is made of closed construction has in axial section two V-shaped opposite limbs 26 and 27. The radially outer limb 26 of the clamping ring 25 lies against the inner side of the holding lip 23 and is clamped between the gripping bead 24 and the inner edge 28 between the retaining lip 23 and the support lip 1. In this respect the inner limb 27 of the clamping ring 25 makes engagement with the outer side of the sealing lip 1. When the clamping ring 25 is held in the recess formed between the supporting lip 1 and the retaining lip 23, the front outer zone of the holding lip 23 is spread apart to such an extent that its external diameter is larger than the diameter, which is the largest possible diameter within the manufacturing tolerance range, of the annular groove floor 12.

For assembly of the sealing ring firstly the holding ring 25 is introduced into the recess between the holding lip 23 and the supporting lip 1. The sealing ring stiffened and clamped in this manner is then introduced so far into the opening of the socket 10 against the weak radially clamping pressure of the clamping ring 25 in an axial direction that the front outer part 29 of the holding lip 23 lies against the floor 12 of the annular groove 8. The front edge 30 of the annular groove 8 is constructed so as to be substantially perpendicular to the annular groove sole 12 in the form of a radial surface like an abutment. This abutment surface 30 can cooperate with the front frontal side of the gripping bead 24 and as a result prevents any pilfering of the sealing ring from the socket. For facilitating introduction of the sealing ring the front edge of the socket 10 is preferably provided with an outwardly opening oblique surface 31.

The sealing ring shown in FIG. 6 is shown in the mounted condition in FIG. 7. The front part 29 of the holding lip 23 makes engagement with the floor 12 of the annular groove. On making an attempt to pull out the sealing ring axially from the socket the front gripping bead 24, which is spread out radially by the clamping ring 25 will make engagement with the front edge 30 of the annular groove 8 and thus prevents any extraction of the clamping ring from the socket 10. The displacement of the sealing ring in an axially inward direction is prevented by the cooperation of the holding lip 23 which is outwardly stressed by the clamping ring 25 in a radial direction with the rear edge 17, which is formed between the rear groove oblique surface and the inner wall of the socket 10. Even in the most unfavorable tolerance of manufacture the displacement of the sealing ring axially inwards into the socket is at the latest prevented by the wedging action of the radially inward edge of the clamping bead 24 between the annular surface 17 and the inner limb 27 of the holding ring 25.

In a manner, which can best be seen from FIG. 7, the holding lip 23 is preferably made longer than the support lip 1. Furthermore preferably the inner limb 27 of the clamping ring 25 is made substantially stiffer and thicker than the outer resilient limb 26. Finally the inner limb 27 of the holding ring 25 is longer than the support lip 1 and is longer than the holding or retaining lip 23, the limb 27 being made by moulding. Owing to this construction two advantages are provided: (1) the supporting lip 1 can be made short and relatively stiff while the holding or retaining lip 23 can simultaneously be made with a relatively soft resilient action; (2) at the frontal side of the projecting stiff limb 27 of the clamping ring 25 it is possible to apply a tool for example which presses the ring into the socket. In this respect it is not necessary to fear that any damage of the sealing lip 1, important for obtaining a proper sealing action, will occur.

On insertion of the spigot (from above, in terms of FIG. 7) into the socket 10 the above described tilting of the sealing ring occurs. In this respect the outer side of the support lip 1 comes clear of the inner limb 27 of the clamping ring 25. Simultaneously the sealing foot lips 6 and 7 make sealing engagement with the inner wall 9 of the socket 10 and the sealing lip 2 is swung axially inwards together with the whole sealing ring.

Figure 8:
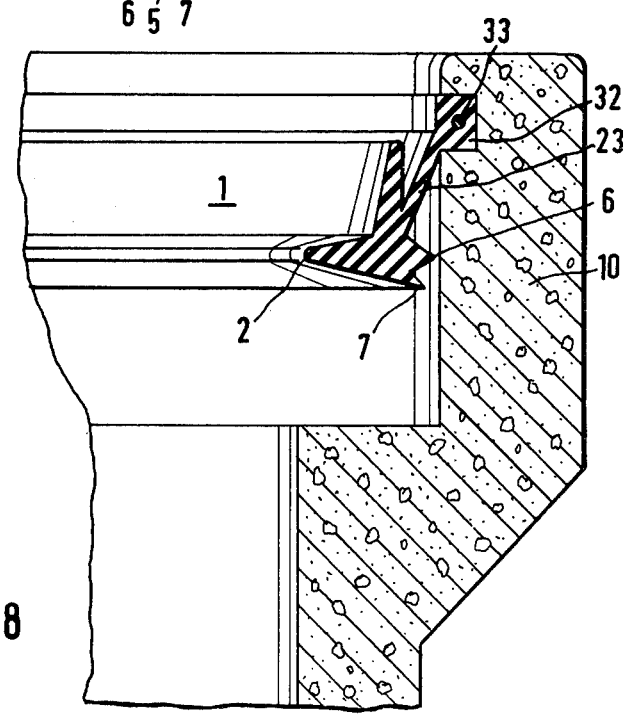
FIG. 8 shows in axial section a further embodiment of a sealing ring used in a socket.

Finally FIG. 8 shows a further embodiment of the sealing ring, which represents a modification of the sealing ring shown in FIG. 7. In a manner similar to the embodiment shown in FIG. 7 on the outer side of the sealing lip 1 adjacent to the sealing foot 3 there is a moulded on integral retaining lip 23. The sealing ring shown in FIG. 8 is however not fixed by means of a clamping ring in the socket and instead is held by means of a retaining ring 32 which is moulded on the front edge of the retaining lip 23. The holding ring 32, preferably reinforced with an annular inlay 33, is pressed and/or stuck in an annular groove, corresponding in profile, at the head of the socket 10. Furthermore the thin retaining lip 23 shown in FIG. 8 does not prevent the swinging of the sealing ring, which in the representation of FIG. 8 occurs in a counter-clockwise direction. As is also the case with the embodiment shown in FIG. 7 the sealing action is brought about on the outer wall of the spigot (not shown in FIGS. 7 and 8) via the sealing lip 2 and the support lip 1 and the sealing action at the inner wall of the socket 10 is brought about via the front sealing foot lip 6 and the rear sealing foot lip 7. The seal produced in this manner is simultaneously completely hermetically sealed with respect to external pressure in internal pressure as well. The holding web 23 and the holding ring 32 do not in this respect have any sealing functions and instead only perform the task of ensuring that on insertion of the spigot the sealing ring is not moved axially inwards instead of being tilted. Simultaneously this arrangement also ensures that the sealing ring already mounted in the socket cannot be pilfered, that is to say removed from the socket, or at least such pilfering is made very difficult.

The embodiment of the invention shown in FIGS. 6 and 7 can be subject to many different variations. Thus for example generally in the vicinity of the inner annular edge 28 between the retaining lip 23 and the support lip 1 an annular groove or recess can be arranged with a circular cross-section, in which an axially pre-stressing open spring ring like an expanding ring is mounted. The holding or retaining lip 23 can in this respect serve as a covering lip for the spring ring and does not need to have the gripping bead 24. Such a spring ring is preferably used with a lubricating substance in the recess in the sealing ring. The sealing ring provided with such a spring ring is preferably used in the manner as shown in FIG. 3 with a broad annular groove 8 in the socket 10. This spring ring more especially ensures stealing or unintentional removal of the sealing ring from the socket in an axially outward direction, for example by children at play.

We claim:

1. A sealing ring of elastic material for a plug-in type pipe joint made up of two concentrically interfitting pipe elements of a mineral material in the case of which the sealing ring can be preassembled by insertion into the outer pipe element or socket before the insertion of the inner pipe element or spigot characterised in that (a) the sealing ring by and large has a substantially V-shaped axial section profile with the formation of two annular lips consisting of a support lip and a sealing lip in that (b) the support lip in the unstressed condition of the sealing ring, when the sealing ring is mounted in the socket, lies substantially axially in the opposite direction to the direction of the insertion of the spigot and has a clearance internal diameter, which is larger than the maximum external diameter, within the range of manufacturing tolerance, of the spigot, in that (c) the sealing lip in the unstressed condition of the sealing ring, when the sealing ring is mounted in the socket, extends substantially radially and has a clearance internal diameter, which is smaller than the smallest external diameter within the range of manufacturing tolerance, of the spigot, in that (d) the sealing ring has a sealing foot, which is opposite to the angle included by the support lip and the sealing lip, in that in the sealing foot of the sealing ring a sealing foot annular groove is provided which forms the sealing foot into a front sealing foot lip which is axially to the front and provides a sealing action against external pressure and forms an axially rear sealing foot lip which provides a sealing action against internal pressure, and said sealing ring can be fixed by its sealing foot by dint of an annular groove constructed in an inner wall of the socket in order to prevent axial displacement of the sealing ring in the insertion direction of the spigot and in that (e) the sealing ring on insertion of the spigot into the socket can be inwardly axially tilted through the radial plane defined substantially by the sealing foot of the sealing ring in such a manner that the support lip and the sealing lip stand substantially symmetrically with respect to the radial plane, and when the spigot is inserted the radial clamping and distortion of the sealing ring in the case of the largest sealing gap permitted in the manufacturing tolerance range the support lip makes a sealing engagement with the external casing of the spigot with respect to external pressure, the sealing lip makes sealing engagement with the external casing of the spigot with respect to internal pressure and the sealing foot makes sealing engagement with the floor of the annular groove or on the inner wall of the socket with respect to internal and external pressure.

2. A sealing ring of elastic material suitable for a plug-in type pipe joint made up of two concentrically interfitting pipe elements of a mineral material, the sealing ring being adapted to be preassembled by insertion into the outer pipe element or socket before insertion of the inner pipe element or spigot, said sealing ring being in the form of an annulus having a cross-section profile comprising:

a first surface extending from an apex radially inwardly in an axially rearward direction, said first surface terminating in a semi-circular surface and tangentially merging into a second surface extending radially inwardly in an axially forward direction, said second surface terminating at a point forming a portion of a support lip, a third surface extending from said point radially inwardly at an obtuse angle to said second surface, said third surface terminating in a second semi-circular surface and merging into a fourth surface radially extending outwardly in an axially forward direction to an extent such that it terminates at the apex forming a portion of a sealing lip, the first and fourth surfaces of said profile at the apex forming a portion of a sealing foot of the sealing ring opposite the angle included by the second and third surfaces whereby the sealing foot can be fixed by dint of an annular groove in the inner wall of the socket in order to prevent axial displacement of the sealing ring in the insertion direction of the spigot whereby the sealing ring, on insertion of the spigot into the socket, can be inwardly axially tilted through the radial plane defined substantially by the sealing foot.

3. A sealing ring as set forth in claim 2 and including a holding ring molded on the sealing ring for engaging the annular groove.

4. A sealing ring as set forth in claim 2 wherein the sealing foot of the sealing ring has an annular groove at the apex forming a front sealing foot lip which is axially to the front and provides a sealing action against external pressure and a rear sealing foot lip which provides a sealing action against internal pressure.

5. In the combination of a mineral pipe element or socket and a sealing ring for connecting the socket on an inner pipe element or spigot to form a plug-in type joint made up of two concentrically interfitting pipe elements, the improvement in a sealing ring comprising:

a first surface extending from an apex radially inwardly in an axially rearward direction, said first surface terminating in a semi-circular surface and tangentially merging into a second surface extending radially inwardly in an axially forward direction, said second surface terminating at a point forming a portion of a support lip, a third surface extending from said point radially inwardly at an obtuse angle to said second surface, said third surface terminating in a second semi-circular surface and merging into a fourth surface radially extending outwardly in an axially forward direction to an extent such that it terminates at the apex forming a portion of a sealing lip, the first and fourth surfaces of said profile at the apex forming a portion of a sealing foot of the sealing ring opposite the angle included by the second and third surfaces whereby the sealing foot can be fixed by dint of an annular groove in the inner wall of the socket in order to prevent axial displacement of the sealing ring in the insertion direction of the spigot whereby the sealing ring, on insertion of the spigot into the socket, can be inwardly axially tilted through the radial plane defined substantially by the sealing foot.

6. In a plug-in type joint made up of two concentrically interfitting pipe elements of a mineral material, the improvement in a sealing ring of elastic material preassembled by insertion of the sealing ring into the outer pipe element or socket before the insertion of the inner pipe element or spigot, said sealing ring comprising:

a member having a substantially V-shaped axial section profile including a pair of annular lips consisting of a support lip and a sealing lip, the support lip, in the unstressed condition of the sealing ring when the sealing ring is mounted in the socket, lying substantially axially in the opposite direction to the direction of insertion of the spigot and having a clearance internal diameter which is larger than the maximum external diameter within the range of manufacturing tolerance of the spigot, the sealing lip, in the unstressed condition of the sealing ring when the sealing ring is mounted in the socket, extending substantially radially and having a clearance internal diameter which is smaller than the smallest external diameter within the range of manufacturing tolerance of the spigot, the sealing ring having a sealing foot opposite the angle included by the support lip and the sealing lip, said sealing ring being fixed by its sealing foot by dint of an annular groove constructed in the inner wall of the socket in order to prevent axial displacement of the sealing ring in the insertion direction of the spigot, the sealing ring, on insertion of the spigot into the socket, being inwardly axially tilted through the radial plane defined substantially by the sealing foot of the sealing ring in such a manner that the support lip and the sealing lip stand symmetrically with respect to the radial plane, and when the spigot is inserted the radial clamping and distortion of the sealing ring in the case of the largest sealing gap permitted in the manufacturing tolerance range, the support lip makes a sealing engagement with the external casing of the spigot with respect to external pressure, the sealing lip makes sealing engagement with the external casing of the spigot with respect to internal pressure and the sealing foot makes sealing engagement with the annular groove or inner wall of the socket with respect to internal and external pressure.

7. The plug-in type joint of claim 6 wherein said sealing ring has an annular groove constructed in the sealing foot to form a front sealing foot lip which is axially to the front and provides a sealing action against external pressure and to form an axially rear sealing foot lip which provides a sealing action against internal pressure.

8. The plug-in type joint of claim 6 including a holding ring connected to the sealing ring by an intermediate web, said holding ring engaging the annular groove constructed in the inner wall of the socket with a sealing action.

9. The plug-in type joint of claim 6 wherein the radially outer side of the support lip of said sealing ring which is to the rear axially of the direction of insertion of the spigot, ahead of the sealing line of the sealing foot includes an annular groove, covered by a covering lip facing in the direction opposite to the direction of insertion and wherein, in the covered annular groove, there is a radially outwardly acting loading resilient ring which urges the sealing ring into the annular groove formed in the inner wall of the socket.

10. The plug-in type joint of claim 6 wherein said sealing ring has a holding lip molded thereto for attachment of the sealing ring to the annular groove formed in the inner wall of the socket to provide for tilting of the support lip and the sealing lip on the radially outer side of the support lip in its zone which is to the rear considered axially in the direction of the spigot ahead of the sealing line of the sealing foot; the holding lip having on its free front edge a molded on clamping bead; a radially outwardly clamping ring inserted between the holding lip and the outer side of the support lip; said clamping ring being resiliently elastic, of closed construction, and substantially V-shaped in axial section; the clamping ring being so mounted that it opens axially outwards in a direction opposite to the direction of insertion of the spigot; and when the sealing ring is inserted into the socket, at least the zone adjacent the gripping bead lies in the annular groove of the socket and the clamping bead can cooperate with an axially front flank of the annular groove in the socket.

11. The plug-in type joint of claim 10 wherein the clamping ring is made of plastics.

12. The plug-in type joint of claim 10 wherein the holding lip is axially longer than the support lip.

13. In a plug-in type joint made up of two concentrically interfitting pipe elements of a mineral material, the improvement in a sealing ring of elastic material preassembled by insertion of the sealing ring into the outer pipe element or socket before insertion of the inner pipe element or spigot, said sealing ring being in the form of an annulus having a cross-sectional profile comprising:

a first surface extending from an apex radially inwardly in an axially rearward direction, said first surface terminating in a semi-circular surface and tangentially merging into a second surface extending radially inwardly in an axially forward direction, said second surface terminating at a point forming a portion of a support lip, a third surface extending from said point radially inwardly at an obtuse angle to said second surface, said third surface terminating in a second semi-circular surface and merging into a fourth surface radially extending outwardly in an axially forward direction to an extent such that it terminates at the apex forming a portion of a sealing lip, the first and fourth surfaces of said profile at the apex forming a portion of a sealing foot of the sealing ring opposite the angle included by the second and third surfaces whereby the sealing foot can be fixed by dint of an annular groove in the inner wall of the socket in order to prevent axial displacement of the sealing ring in the insertion direction of the spigot whereby the sealing ring, on insertion of the spigot into the socket, can be inwardly axially tilted through the radial plane defined substantially by the sealing foot.

14. In the combination of a mineral pipe element or socket and a sealing ring for connecting the socket on an inner pipe element or spigot to form a plug-in type joint made up of two concentrically interfitting pipe elements, the improvement in a sealing ring comprising:

a member having a substantially V-shaped axial section profile including a pair of annular lips consisting of a support lip and a sealing lip, the support lip, in the unstressed condition of the sealing ring when the sealing ring is mounted in the socket, lying substantially in the opposite direction to the direction of insertion of the spigot and having a clearance internal diameter which is larger than the maximum external diameter within the range of manufacturing tolerance of the spigot, the sealing lip, in the unstressed condition of the sealing ring when the sealing ring is mounted in the socket, extending substantially radially and having a clearance internal diameter which is smaller than the smallest external diameter within the range of manufacturing tolerance of the spigot, the sealing ring having a sealing foot opposite the angle included by the support lip and the sealing lip, said sealing ring being fixed by its sealing foot by dint of an annular groove constructed in the inner wall of the socket in order to prevent axial displacement of the sealing ring in the insertion direction of the spigot, the sealing ring, on insertion of the spigot into the socket, being inwardly axially tilted through the radial plane defined substantially by the sealing foot of the sealing ring in such a manner that the support lip and the sealing lip stand symmetrically with respect to the radial plane, and when the spigot is inserted the radial clamping and distortion of the sealing ring in the case of the largest sealing gap permitted in the manufacturing tolerance range, the support lip makes a sealing engagement with the external casing of the spigot with respect to external pressure, the sealing lip makes sealing engagement with the external casing of the spigot with respect to internal pressure and the sealing foot makes sealing engagement with the annular groove or inner wall of the socket with respect to internal and external pressure.

15. The combination as set forth in claim 14 wherein there is a holding ring connected to the sealing ring by an intermediate web, said holding ring engaging the annular groove constructed in the inner wall of the socket with a sealing action.

* * * * *

UNITED STATES PATENT AND TRADEMARK OFFICE
CERTIFICATE OF CORRECTION

PATENT NO. : 4,188,040

DATED : February 12, 1980

INVENTOR(S) : Franz-Josef Wolf et al.

It is certified that error appears in the above-identified patent and that said Letters Patent are hereby corrected as shown below:

Column 3 Line 9 "and" should read --for--.

Claim 14 - Column 14 Line 15 After "substantially" insert --axially--.

Signed and Sealed this

Sixth Day of May 1980

[SEAL]

Attest:

SIDNEY A. DIAMOND

Attesting Officer

Commissioner of Patents and Trademarks